United States Patent
Silver

[19]

[11] Patent Number: 6,069,742
[45] Date of Patent: May 30, 2000

[54] OPTICAL APPARATUS AND METHOD

[75] Inventor: Joshua David Silver, 19 Cumnor Rise Road, Oxford, OX2 9HD, United Kingdom

[73] Assignee: Joshua David Silver, Oxford, United Kingdom

[21] Appl. No.: 08/973,314

[22] PCT Filed: Jun. 1, 1996

[86] PCT No.: PCT/GB96/01304

§ 371 Date: Mar. 2, 1998

§ 102(e) Date: Mar. 2, 1998

[87] PCT Pub. No.: WO96/38744

PCT Pub. Date: Dec. 5, 1996

[30] Foreign Application Priority Data

Jun. 1, 1995 [GB] United Kingdom .................. 9511091

[51] Int. Cl.[7] ................ G02B 1/06; G02C 7/02; G02C 7/06
[52] U.S. Cl. .............. 359/666; 351/41; 351/159; 351/169
[58] Field of Search ...................... 359/665, 666, 359/846, 847; 351/159, 168, 169, 176, 41

[56] References Cited

FOREIGN PATENT DOCUMENTS

| 75257 | 1/1978 | France . |
|---|---|---|
| 75257 | 6/1976 | Luxembourg . |
| 258325 | 9/1926 | United Kingdom . |
| 571912 | 9/1945 | United Kingdom . |

*Primary Examiner*—Georgia Epps
*Assistant Examiner*—Jordan M. Schwartz
*Attorney, Agent, or Firm*—Sughrue, Mion, Zinn, Macpeak & Seas, PLLC

[57] ABSTRACT

In the field of eyesight correction, there is a need for "universal" spectacles that can be tailored in situ to suit an individual's requirements. The disclosure relates to an apparatus, which may be in the form of a pair of spectacles (1) including one or more liquid lenses (11a, 11b). The apparatus also includes a sealable duct (24) and a pump (e.g., a syringe) for adjusting the pressure of liquid in the liquid lens. In use, the apparatus is adjusted to provide eyesight correction for an individual. The duct (24) is then sealed, thereby rendering the apparatus subsequently non-adjustable and therefore permanently tailored to the requirements of the individual. The disclosure also relates to an apparatus in the form of a flexible membrane mirror.

24 Claims, 2 Drawing Sheets

OPTICAL APPARATUS AND METHOD

BACKGROUND OF THE INVENTION

1. Field of the Invention

This invention relates to an optical apparatus and method of adjusting an optical apparatus for correcting defective eyesight. In particular, the invention relates to an optical apparatus comprising at least one liquid lens or flexible membrane mirror, and more particularly to a pair of spectacles constituted by or including such an apparatus.

2. Related Art

It is known to provide a liquid lens in the form of one or more transparent, circular, flexible membranes clamped about a peripheral zone to define a cavity. The cavity is filled with a transparent liquid, the pressure of which is adjustable by means of a positive displacement pump such as a syringe.

Adjustments of the pressure of fluid in the cavity cause variations in the curvature of the lens defined by the membranes and fluid, thereby giving rise to a lens of infinitely variable optical power.

U.S. Pat. No. 4,890,903 gives further details of liquid lenses, and of optical instruments such as spectacles incorporating such lenses. The entire disclosure of U.S. Pat. No. 4,890,903 is incorporated herein by reference.

The history of liquid lenses goes back several decades, yet there has not previously been a proposal for a truly practical sight-correcting device incorporating such lenses.

SUMMARY OF THE INVENTION

According to a first aspect of the invention, there is provided an optical apparatus comprising:

- at least one liquid lens or flexible membrane mirror;
- a liquid pump for adjusting the pressure of a liquid in a cavity of the lens or mirror;
- a closeable duct for interconnecting the cavity and the pump permitting the flow of liquid therebetween; and
- a closure for closing the duct when the pressure of liquid in the said cavity attains a desired value, whereby to render the lens or mirror subsequently non-adjustable.

The principal advantage of such an arrangement over previous apparatuses is that the liquid lens or lenses become non-adjustable after adjustment of the lens or lenses to a desired setting. This is in contrast to previous apparatuses, in which the liquid lenses have remained perpetually adjustable. Thus, previous liquid lens apparatuses could not be incorporated into spectacles partly because of the cumbersome nature of the pumps needed for adjustment of the lenses; and partly because of the risk of the optical power of the lenses deviating from optima tailored for the wearer of the spectacles.

Thus, an apparatus according to the invention confers a robustness and practicality not achievable with previous liquid lens designs.

Preferably the closure includes a portion of the duct plastically deformable to close the duct. In particularly preferred embodiments, the duct is plastically deformable when compressed and or when heated. A further possibility is for the duct to be plastically deformable when subjected to ultrasonic excitation.

The foregoing features mean that apparatus according to the invention can readily be adjusted to a preferred optical power of the lenses, and easily set at the preferred optical power.

Conveniently, the pump is a positive displacement pump capable of increasing and decreasing the pressure of liquid in the cavity. In particular preferred embodiment, the pump is a syringe.

Syringes are mass-produced at extremely low cost, and therefore they provide a simple, inexpensive means of setting the power of the lenses of an apparatus according to the invention, eg. in a harsh environment.

In some embodiments of the invention, the closure preferably includes a member retentively deformable to close the duct. One form of such a member is a resiliently deformable bung closing the duct. For use with such a bung, the pump may include or be operatively connected to a further duct capable of removably piercing the bung to permit the flow of liquid between the pump and the cavity, the resilience of the bung (a) creating a liquid-tight seal about the further duct when the bung is pierced thereby; and (b) causing closure of the aperture pierced by the further duct on removal thereof from the bung.

In particular preferred embodiments, the further duct is a hollow needle.

Thus it is possible to devise embodiments of the invention in which the pump is a conventional syringe having a conventional hypodermic needle secured thereto, in order to piece a resiliently deformable bung that re-sealably closes the duct of the apparatus.

Yet a further possibility for closing the duct is for the retentively deformable member to include opposed, interior walls of the duct capable of sealingly adhering one to another on compression of the duct. In preferred embodiments, this is achieved by virtue of adhesive matter secured on the opposed, inner walls of the duct.

Using this embodiment, it is possible to seal the duct without employing any additional components, other than a simple apparatus such as a pair of pliers or pincers to compress the duct.

The invention is also considered to reside in a pair of spectacles including an apparatus as defined hereinabove, the apparatus preferably including a pair of liquid lenses.

The advantageous features defined hereinabove in relation to the apparatus are of particular benefit when the apparatus is incorporated in a pair of spectacles. In particular, spectacles according to the invention provide the possibility of correction of many eyesight defects, without the need for a skilled optometrist in assessing the optical power of the lenses required for such correction. This in turn makes the spectacles particularly suitable for use in so-called developing countries, where the incidence of various eyesight defects is high yet there are few skilled opticians and very little equipment for testing of eyesight in conventional ways.

Furthermore, since spectacles according to the invention can be manufactured in large numbers without the need for variation between different pairs of spectacles at the manufacturing stage, the purchase price of spectacles according to the invention can if desired be made sufficiently low to enable their purchase by inhabitants of developing countries or by charities providing aid in such countries.

Conveniently the pair of spectacles includes a respective liquid pump and a respective closable duct for each lens. These features advantageously permit employment of an inventive method of adjusting the spectacles for correcting eyesight defects, as defined hereinbelow.

Preferably each closable duct is flexible and the frame of the spectacles includes one or more recesses for receiving the pump or a duct after closing thereof. More preferably, each recess is closable to conceal the closed ducts. This permits the construction of an aesthetically pleasing pair of spectacles, in which the closable ducts are protected from damage.

In practical embodiments of the spectacles according to the invention, each lens includes a rigid, transparent cover for protecting a flexible membrane of the lens. Optionally, each transparent cover has an optically corrective effect. Multiple protective covers may be supplied if desired, eg. on the front and rear face of each liquid lens of the spectacles, in order to protect the lenses against damage.

If one or more of the protective covers has an optically corrective effect, a number of advantages may inure to spectacles according to the invention. For example, the protective covers may provide a degree of inherent correction in the spectacles regardless of the pressures in the liquid lenses, thereby conveniently limiting the range of adjustment of the liquid lenses required to provide improvements in eyesight for the majority of users of the spectacles.

Also, although it is possible to construct liquid lenses that have a concavo-convex shape, it is far simpler to construct liquid lenses of convex lens shape. Such lenses do not provide correction for conditions such as astigmatism. The protective covers may, particularly if present at the front and rear faces of the liquid lenses, be shaped to provide correction for such conditions thereby obviating the need for the liquid lenses to provide correction for conditions other than myopia and presbyopia.

Optionally each transparent cover has an optical filtering effect. Thus it is possible in accordance with the invention to manufacture eg. corrective sun glasses and welding masks.

Preferably the optical apparatus also includes one or more compound, fluid lenses. Further details of such lenses are provided in the aforementioned U.S. Pat. No. 4,890,903.

Embodiments of apparatuses, including spectacles, in accordance with the invention may optionally be such that the or a fluid lens thereof contains a predetermined quantity of liquid, the pump thereof being capable of adjusting the fluid pressure in the lens cavity in a limited range. Thus it would be possible to manufacture and supply spectacles having a predetermined quantity of fluid in each lens, and simply connect the pump, including a small reservoir of the fluid, to each lens at the point of use, ie. when it is required to adjust and set the spectacles for use by an individual. This avoids the need for the pump to include a sufficiently large supply of liquid to fill the lens from empty, although such lens and pump combinations are considered to be within the scope of the invention.

According to a second aspect of the invention, there is provided a method of adjusting an apparatus for correcting defective eyesight, comprising the steps of:

(i) placing an apparatus as defined hereinabove in front of a patient's eye such that the eve receives light through the or a lens thereof;

(ii) operating the pump of the apparatus until the patient sees an optimum clarity image;

(iv) detaching the pump from the apparatus.

Desirably, the patient views a distant object during step (ii).

This method is particularly suitable when the apparatus is configured as eg. a monocle or similar device intended for use by one eye only of a patient. Thus this aspect of the inventive method is particularly suitable for patients who have sight in only one eye, a condition common in many developing countries.

According to a third aspect of the invention, there is provided a method of adjusting an apparatus for correcting defective eyesight, comprising the steps of, in any practical order:

(i) placing a pair of spectacles as defined hereinabove in front of a patient's eyes so that each of the patient's eyes receives light via a respective lens of the spectacles;

(ii) obscuring the pupil of a first of the patient's eyes;

(iii) operating the pump of the lens associated with the second of the patient's eyes until the said second eye sees an optimum clarity image;

(iv) closing the duct between the said lens and its associated pump;

(v) uncovering the pupil of the first eye;

(vi) obscuring the pupil of the patient's second eye;

(vii) repeating steps (iii) and (iv), mutatis mutandis, with respect to the patient's second eye; and (viii) detaching the or each pump from the apparatus.

Desirably step (iii) is carried out each time while the patient views an object, which may be either distant or proximal.

This aspect of the inventive method is suitable for patients having the use of both eyes, one or both of which require correction.

Conveniently, when the spectacles include a recess as defined hereinabove, the method may include the further steps of:

(ix) after closing, placing each duct in a recess of the spectacles; and (x) covering the or each recess.

Thus it will be seen that the apparatuses and methods of the invention provide a convenient, cheap and rapid means of correcting eyesight through use of monocles and spectacles. However, the ability to set the power of the liquid lens deriving from the invention is not limited to applications in which correction of defective sight is required. Further exemplary applications include adjustment of convex mirrors provided for security in shops and for safety purposes at difficult road junctions; focusing of light beams eg. for use in illuminating buildings, either through use of fluid lenses or flexible membrane mirrors; and numerous other occasions when it is required to tailor the optical power of a lens or mirror to a particular requirement and set the optical power so that it is subsequently non-adjustable.

There now follows a description of preferred embodiments of the invention, by way of example, with reference being made to the accompanying drawings in which:

DETAILED DESCRIPTION OF THE PREFERRED EMBODIMENT

Figure 1:
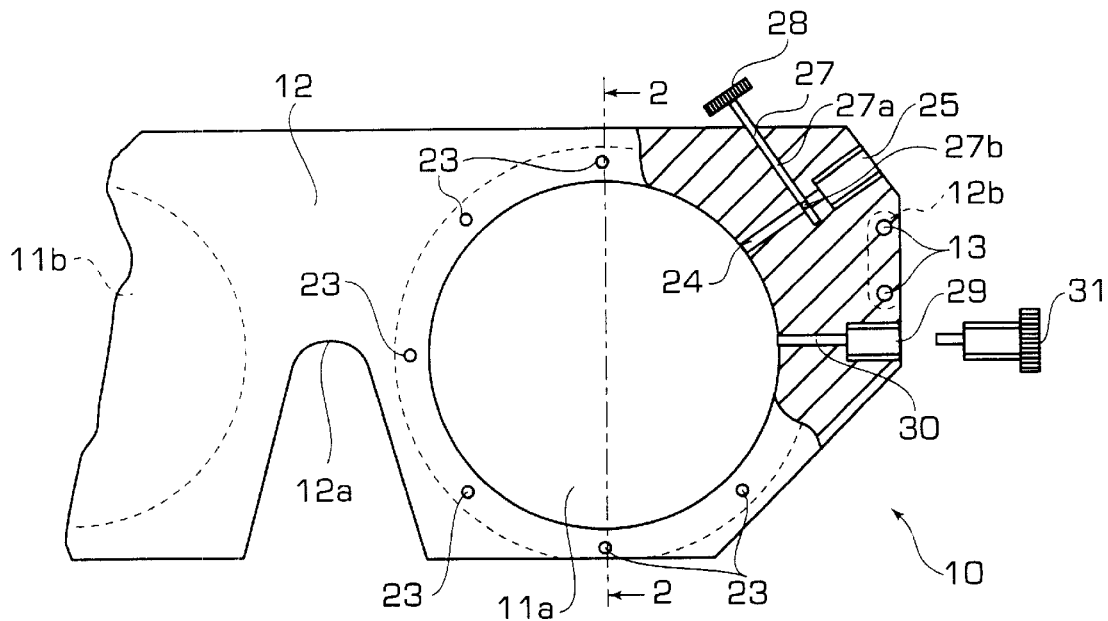
FIG. 1 is a partly sectioned view of a pair of spectacles manufactured in accordance with the invention.

Referring to the drawings, there is shown a pair of spectacles 10 in accordance with the invention. As is best shown in FIG. 1, the spectacles 10 include a pair 11a, 11b of liquid lenses each of which may generally be of the kind disclosed in U.S. Pat. No. 4,890,903. The lenses 11a, 11b are secured in a frame 12 shaped in the conventional manner of spectacles, and including a bridge 12a and a pair of side arms 12b (one of which is visible in FIG. 1) secured to the frame 12 in a conventional manner eg. through use of rivets or screws 13.

Figure 2A:
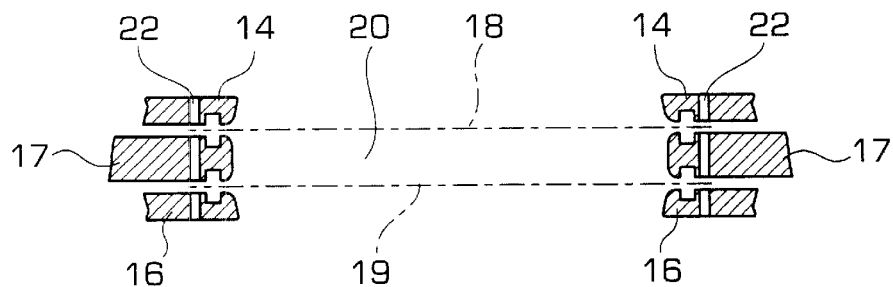
FIG. 2a is a-cross section-on line 2—2 of FIG. 1 showing details of the securing arrangement for the membranes of the lenses.
Figure 2B:
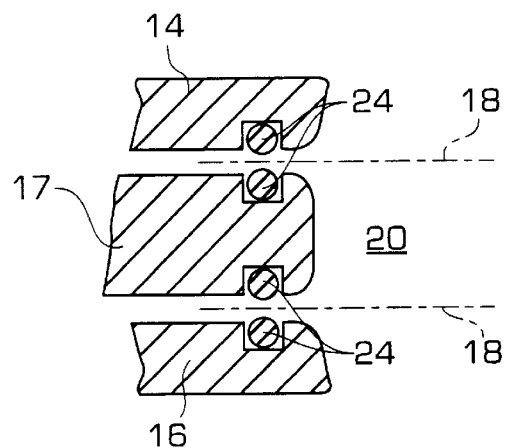
FIG. 2b shows a portion of the FIG. 2a arrangement in more detail.

As is best shown in FIGS. 2a and 2b, the frame 12 is in the vicinity of each lens 11a, 11b a laminar structure having a top plate 14, a bottom plate 16 and a middle plate 17 sandwiched between the top and bottom plates. A pair of flexible, transparent membranes 18, 19 (eg. of 23 micron thickness type D "Mylar" (RTM) material) are secured respectively between the middle plate 17 and the upper plate 14; and between the middle plate 17 and the lower plate 16, to define a liquid lens cavity 20.

The membranes 18, 19 are circular, and the plates 14, 16, 17 include a circular series of aligned apertures 22 for receiving eg. set screws 23 for clamping the membranes 18, 19 between the plates.

Each aperture 22 in the bottom plate 16 may be suitably tapped for engagement with the threaded end of a set screw 23.

As is best shown in FIG. 2b, the membranes 18, 19 are clamped by virtue of opposed O-rings 24 in the manner described in U.S. Pat. No. 4,890,903. This arrangement ensures that each membrane experiences a radially outwardly directed tension.

The components of FIGS. 2a and 2b are shown spaced apart, but in use of the apparatus would of course be clamped tightly together by virtue of the screws 23.

As is shown in FIG. 1, the cavity 20 of each lens 11a, 11b is connected to a filling duct 24 passing through a portion of intermediate plate 17. Filling duct 24 opens into a recess 25 that is open-ended on the exterior of the frame 12 of the spectacles 10. Recess 25 is capable of sealingly receiving eg. a filler tube for the transparent liquid intended to fill the lens. Thus, filling of each lens is possible via its associated recess 25 and filler duct 24.

The FIG. 1 embodiment shows a valving member 27 comprising a shaft 27a having a through-going aperture 27b that is alignable with the longitudinal axis of duct 24 in order to permit flow of fluid along duct 24. Shaft 27a is rotatable by virtue of knurled ring 28 in order to rotate aperture 27b out of alignment of the longitudinal axis of duct 24, thereby closing the duct when desired.

The spectacles of FIG. 1 include a further, threaded recess 29 extending between a peripheral edge of the middle plate 17 and a second duct 30 also connected to the cavity 20 of each lens 11a, 11b. A threaded plug 31 is sealingly insertable into recess 29, in order selectively to seal 30. The presence of duct 30 and recess 29 permits the expulsion of gas from cavity 20 during filling thereof. After filling, plug 31 is used to close duct 30 against leakage of liquid.

Although the spectacles of FIG. 1 are highly effective in correcting defective vision, they are likely, by virtue of the valving member 27, plug 31 and generally heavy design of the frame 12, to be regarded as unacceptably cumbersome by potential wearers. The embodiments of FIGS. 3 to 5 therefore serve to make the spectacles lighter and more aesthetically appealing.

It is envisaged that production embodiments of the spectacles would be supplied with the lens cavities 20 pre-filled with a predetermined volume of transparent liquid. Since the pre-filling would be carried in a factory environment, the duct 30 could, after filling, be sealed permanently, eg. by welding, insertion of a settable material or by screwing a flush-fitting plug into a threaded aperture similar to recess 29. Therefore, mass produced versions of the spectacles would dispense with the plug 31 per se thereby lightening the spectacles and making them more pleasing aesthetically.

Figure 3:
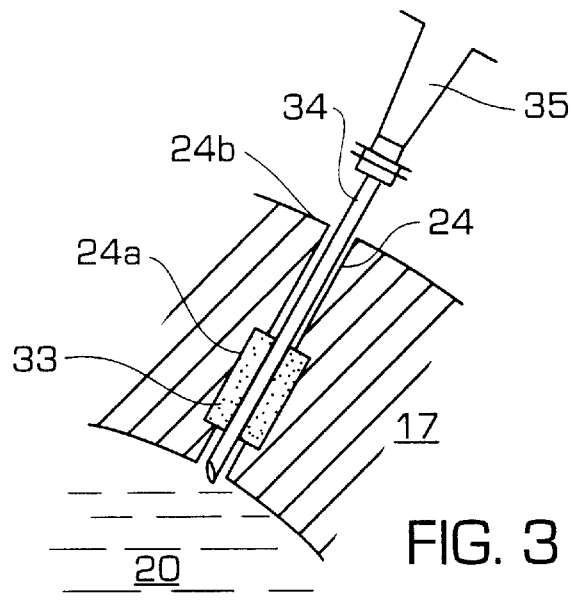
FIG. 3 shows one form of re-sealable closure for the duct of the spectacles of FIG. 1.

In the FIG. 3 embodiment, the valving member 27 and the recess 25 are dispensed with. Instead, each duct 24 includes a portion 24a that is of enlarged diameter in order snugly to receive a resiliently deformable bung 33 that normally seals duct 24 in a liquid-type manner.

When it is required to adjust the pressure in cavity 20, a hypodermic-type needle 34, operatively secured to a syringe 35 serving as a positive displacement pump for the transparent liquid (eg an inert silicone oil) is inserted into duct 24 so as completely to pierce bung 33, thereby providing a fluid communication path between syringe 35 and cavity 20. During this process, the resilience of the material of bung 33 causes bung 33 to seal about needle 34 in a liquid-tight manner, thereby preventing leakage of liquid from the cavity 20.

After adjustment of the pressure in cavity 20, by virtue of movement of the piston of syringe 35, needle 34 is withdrawn from bung 33. The resilience of bung 33 causes the aperture previously formed by needle 34 to self-seal, thereby closing duct 24 in order to prevent further adjustment of the optical power of the lens 20.

If desired, a suitable cap may be inserted into the upper end 24b of duct 24, in order to prevent in the ingress of dirt, etc.

Figure 4:
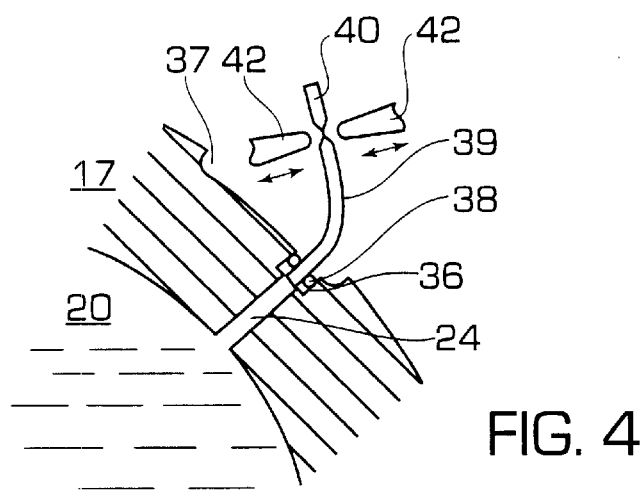
FIG. 4 shows another form of closure.

An alternative arrangement is shown in FIG. 4. In this embodiment, duct 24 opens into an enlarged-diameter portion 36 that itself opens into an elongate recess 37 formed as a depression in the outer surface of the middle portion 17 of frame 12.

Enlarged-diameter portion 26 contains seated therein in a conventional manner an O-ring grommet 38 that serves to retain a flexible, hollow tube 39. Grommet 38 seals around tube 39 and around the interior of enlarged diameter portion 36 in a liquid-tight manner, so that tube 39 is capable of communicating liquid, via duct 24, and from cavity 20. Alternatively, tube 39 may be bonded directly e.g. to duct 24, thereby obviating the need for grommet 38.

The free end 40 of tube 39 may be connected to a positive displacement pump such as syringe 35 for adjustment of the pressure of liquid in the cavity 20. After adjustment of the liquid pressure in order to achieve a desired dioptre setting of the lens 20, the tube 39 is sealed by virtue of a pair of jaws 42 being moved towards one another to seal tube 39.

Tube 39 may be such as to deform plastically under the influence of heat, pressure and/or ultrasonic excitation. Jaws 42 may be such as to supply such forms of energy to tube 39 when jaws 42 are brought into contact with opposed sides of tube 39.

One particularly preferred form of the jaws 42 that may be of benefit in developing countries is a pair of jaws 42 heated by virtue of a propane burner that would cause plastic, sealing deformation of tube 39 when the jaws 42 are brought together about tube 39.

Numerous other methods of sealing tube 39 are possible, for example a constricting collar may be applied to tube 39. Also, alternative methods of securing tube 39 in enlarged-diameter portion 36 may be employed.

After sealing of tube 39, it is tucked into recess 37. A cover 43 may be snap-fitted to the exterior surface of frame 12 as shown in FIG. 5, in order to provide an aesthetically pleasing appearance to the spectacles 10.

Figure 5:
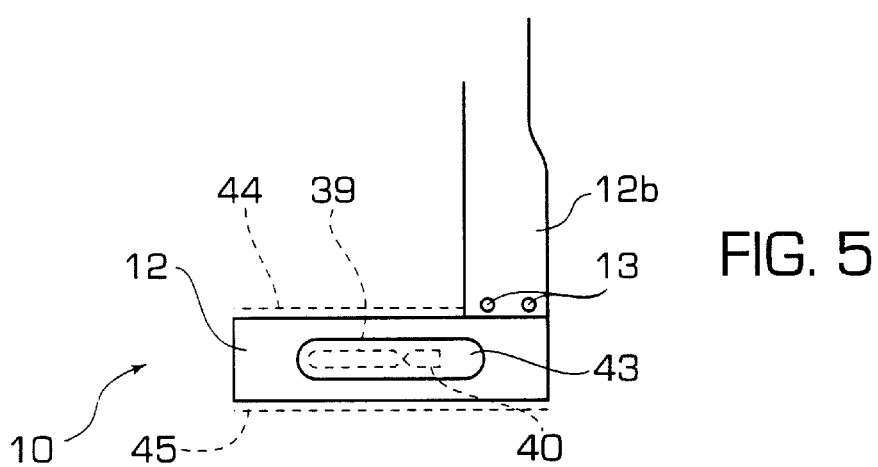
FIG. 5 shows a pair of spectacles incorporating the FIG. 4 embodiment.

The FIG. 5 embodiment also shows schematically, in dotted lines, a pair of rigid, transparent covers 44, 45 secured respectively on either side of each lens 11a, 11b in order to prevent damage to the lenses. If desired, as previously discussed, the covers 44, 45 may have optically corrective and/or filtering properties.

In practice, the covers 44, 45 may be contained within the "envelope" defined by the profile of the frame 12, in order to provide an aesthetically pleasing appearance to the spectacles. Alternatively, the covers 44, 45 may be retained by virtue of slots or clips on the exterior of frame 12.

There now follows a description of a method of adjusting apparatus for correcting sight defects, in accordance with the invention.

As previously mentioned, the spectacles are likely to be supplied pre-filled with a suitable transparent fluid. The wearer puts the spectacles on, closes one eye and adjusts the pressure of liquid in the lens in front of the other eye whilst looking at e.g. a distant or proximal object object so as to achieve sharp focus for that eye. The wearer then closes the eye previously open, and opens the eye previously closed. He then adjusts the pressure of liquid in the lens in front of the now open eye, whilst looking at distant object to achieve sharp focus for that eye.

At suitable points in the procedure (after each lens has been set to a desired pressure) the ducts 24 for the respective lenses are closed by one of the methods disclosed herein, thereby rendering the lenses of the spectacles subsequently non-adjustable.

If the embodiment of FIGS. 4 and 5 is used, after closing of the duct 24 the cover 43 is applied to the recess 37 for each tube 39.

A simplified procedure may be adopted when it is required only to correct the vision of one eye of a user of apparatus in accordance with the invention. The simplified procedure involves looking through an apparatus according to the invention and having at least one liquid lens, whilst looking at a distant object. The pressure of liquid in the lens is then adjusted in order to achieve sharp focus for the eye the eyesight of which is being corrected. Subsequently, the duct 24 of the apparatus is closed in accordance with one of the aforementioned methods to render the lens subsequently non-adjustable.

It will thus been seen that the apparatus conveniently provides a low-cost solution to the problem of correcting eye defects in a great number of people.

I claim:

1. An optical apparatus comprising:
    a liquid lens;
    a liquid pump for adjusting the pressure of liquid in a cavity of said lens;
    a closeable tube for interconnecting said cavity and said liquid pump, said pump permitting the flow of liquid therebetween;
    a closure for closing the tube when the pressure of liquid in said cavity attains a desired value, whereby to render the lens subsequently non-adjustable; and
    a frame including at least one elongate recess for receiving said closeable tube after closing thereof, wherein at least a portion of said closeable tube is outside of the frame prior to being received within said elongate recess.

2. An optical apparatus according to claim 1 wherein the closure includes a portion of the duct plastically deformable to close the duct.

3. An apparatus according to claim 2 wherein said portion of the duct is plastically deformable when compressed.

4. An apparatus according to claim 2 wherein said portion of the duct is plastically deformable when heated.

5. An apparatus according to claim 2 wherein said portion of the duct is plastically deformable when subjected to ultrasonic excitation.

6. An apparatus according to claim 1 wherein the liquid pump is a positive displacement pump capable of increasing and decreasing the pressure of the liquid in said cavity.

7. An apparatus according to claim 1 wherein said liquid pump is a syringe.

8. An apparatus according to claim 1, wherein the closure includes a member retentively deformable to close the duct.

9. An apparatus according to claim 8 wherein:
    (i) said member includes a resiliently deformable bung for closing the duct; and
    (ii) said liquid pump is operatively connected to a second duct capable of removably piercing the bung to permit the flow of liquid between the pump and said cavity, the resilience of the bung (a) creating a liquid-tight seal about the second duct when the second duct pierces the bung, and (b) causing closure of the aperture pierced by the second duct on removal thereof from the bung.

10. An apparatus according to claim 9 wherein the second duct is a hollow needle.

11. An apparatus according to claim 8 wherein the retentively deformable member includes opposed, interior walls capable of sealingly adhering one to another on compression of the duct.

12. An apparatus according to claim 11 further including adhesive matter secured on the opposed, inner walls of the duct.

13. A method of adjusting an apparatus for correcting defective eyesight, comprising the steps of:
    (i) placing a pair of spectacles in front of a patient's eye such that the eye receives light through a lens thereof, said pair of spectacles comprising:
        a first liquid lens;
        a second liquid lens;
        at least one liquid pump for adjusting the pressure of liquid in a cavity of said first liquid lens and said second liquid lens;
        at least one closeable tube for interconnecting said cavity and said at least one liquid pump permitting the flow of liquid therebetween;
        at least one closure for closing said at least one closeable tube when the pressure of a liquid in said cavity attains a desired value, whereby to render said first liquid lens and said second liquid lens non-adjustable; and
        a frame including at least one elongate recess for receiving said closeable tube after closing thereof, wherein at least a portion of said closeable tube is outside of said frame prior to being received within said elongate recess;
    (ii) operating the pump of the apparatus until a patient sees an optimum clarity image;
    (iii) closing the tube of the pair of spectacles; and
    (iv) detaching the pump from the apparatus.

14. A method of adjusting an apparatus for correcting defective eyesight, comprising the steps of:
    (i) placing a pair of spectacles in front of a patient's eyes, said pair of spectacles having
        a first liquid lens;
        a second liquid lens;
        at least one liquid pump for adjusting the pressure of liquid in a cavity of said first liquid lens and said second liquid lens;

at least one closeable tube for interconnecting said cavity and said at least one liquid pump permitting the flow of liquid therebetween;

at least one closure for closing said at least one closeable tube when the pressure of a liquid in said cavity attains a desired value, whereby to render said first liquid lens and said second liquid lens non-adjustable; and a frame including at least one elongate recess for receiving said closeable tube after closing thereof, wherein at least a portion of said closeable tube is outside of said frame prior to being received within said elongate recess;

(ii) allowing each of the patient's eyes to receive light via said respective liquid lens;

(iii) obscuring a pupil of a first of the patient's eyes;

(iv) operating a pump of a lens associated with a second of the patient's eyes until the second eye sees an image of optimum clarity;

(v) closing the closeable tube;

(vi) uncovering the pupil of the first eye;

(vii) uncovering the pupil of the patient's second eye;

(viii) repeating steps (iii) and (iv) with respect to the patient's second eye; and (ix) detaching the pump from the apparatus.

15. A method according to claim 14 comprising the further steps of:

(ix) after closing, placing each duct in a recess of the spectacles; and (x) covering each recess.

16. A pair of spectacles comprising:

a first liquid lens;

a second liquid lens;

at least one liquid pump for adjusting the pressure of liquid in a cavity of said first liquid lens and said second liquid lens;

at least one closeable tube for interconnecting said cavity and said at least one liquid pump permitting the flow of liquid therebetween;

at least one closure for closing said at least one closeable tube when the pressure of a liquid in said cavity attains a desired value, whereby to render said first liquid lens and said second liquid lens non-adjustable; and a frame including at least one recess for receiving said at least one closeable tube after closing thereof, wherein at least a portion of said closeable tube is outside of said frame prior to being received within said elongate recess.

17. A pair of spectacles according to claim 16 further comprising a respective liquid pump and a respective closeable duct for each lens.

18. A pair of spectacles according to claim 16 wherein said closeable duct is flexible and the frame of said spectacles includes one or more recesses for receiving the duct after closing thereof.

19. A pair of spectacles according to claim 18 wherein the recess is closeable to conceal the closed ducts.

20. A pair of spectacles according to claim 16, wherein each lens includes a rigid, transparent cover for protecting a flexible membrane of the lens.

21. A pair of spectacles according to claim 20 wherein the transparent cover has an optically corrective effect.

22. A pair of spectacles according to claim 20, wherein the transparent cover-has an optical filtering effect.

23. A pair of spectacles according to claim 16, wherein the pair of spectacles includes one or more-compound, fluid lenses.

24. A pair of spectacles according to claim 16, wherein the first and second liquid lens thereof contains a predetermined quantity of liquid, the pump therefor being capable of adjusting the fluid pressure in the lens cavity in a limited range.

* * * * *